Jan. 12, 1960 F. VAN MARLE 2,920,553
APPARATUS FOR BUNDLING A PILE OF ARTICLES, SUCH AS
LETTERS, NEWSPAPERS, DOCUMENTS AND THE LIKE
Filed Dec. 10, 1956 11 Sheets-Sheet 3

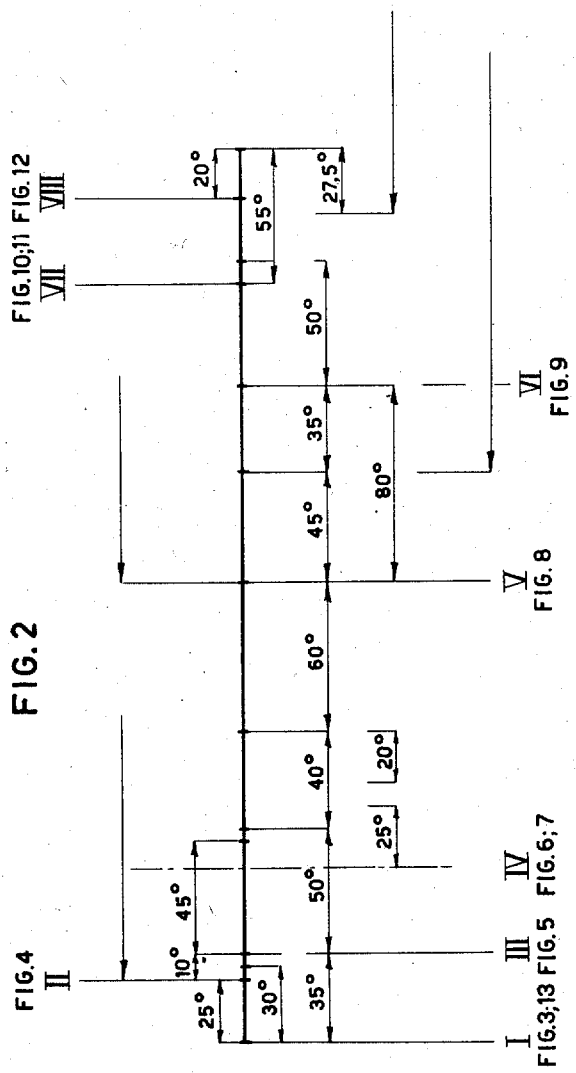

INVENTOR.
FREDERIC VAN MARLE
BY

Jan. 12, 1960  F. VAN MARLE  2,920,553
APPARATUS FOR BUNDLING A PILE OF ARTICLES, SUCH AS
LETTERS, NEWSPAPERS, DOCUMENTS AND THE LIKE
Filed Dec. 10, 1956  11 Sheets-Sheet 4

FREDERIC VAN MARLE INVENTOR.

BY

Jan. 12, 1960     F. VAN MARLE     2,920,553
APPARATUS FOR BUNDLING A PILE OF ARTICLES, SUCH AS
LETTERS, NEWSPAPERS, DOCUMENTS AND THE LIKE
Filed Dec. 10, 1956     11 Sheets-Sheet 6

INVENTOR.
FREDERIC VAN MARLE
BY

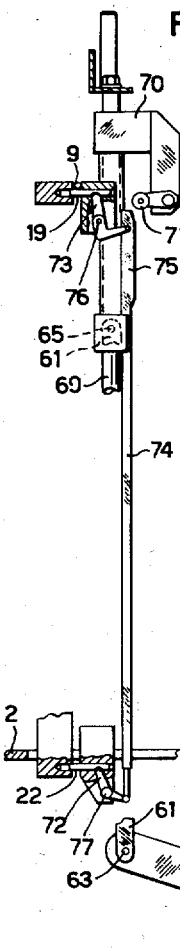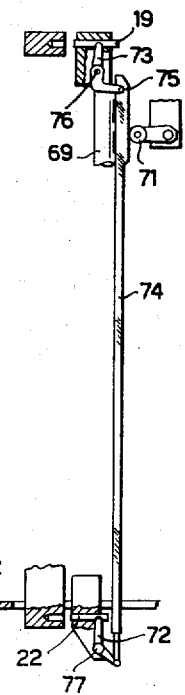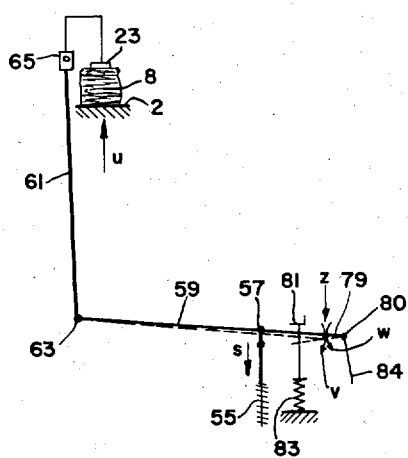

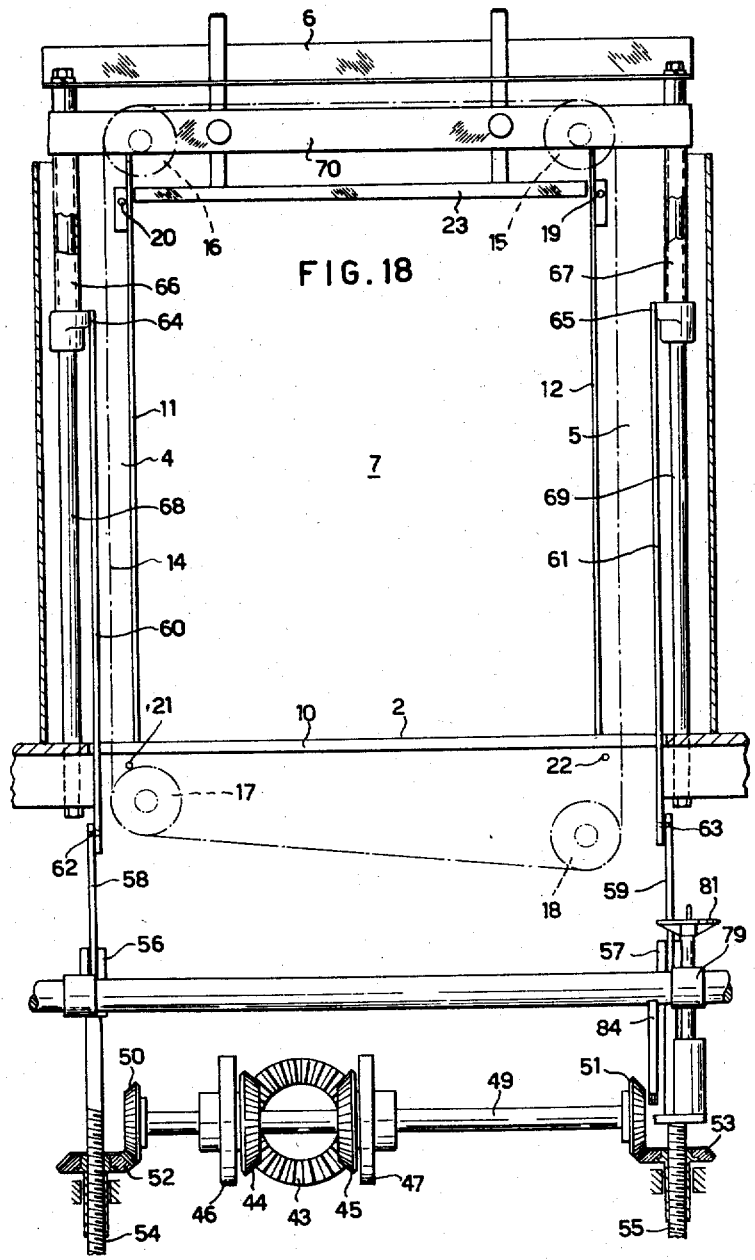

INVENTOR
FREDERIC VAN MARLE
BY

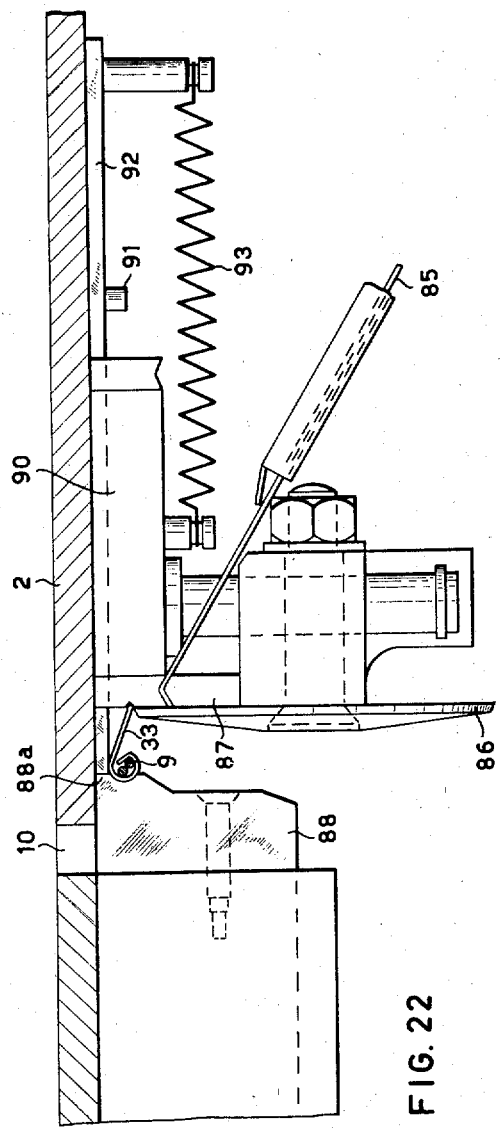

United States Patent Office 2,920,553
Patented Jan. 12, 1960

2,920,553

APPARATUS FOR BUNDLING A PILE OF ARTICLES, SUCH AS LETTERS, NEWSPAPERS, DOCUMENTS AND THE LIKE

Frederick Van Marle, The Hague, Netherlands, assignor to N.V. Technische Maatschappij Marchand-Andriessen, The Hague, Netherlands, a Dutch limited liability company Application December 10, 1956, Serial No. 627,278

Claims priority, application Netherlands December 10, 1955

9 Claims. (Cl. 100—27)

The invention relates to improvements in an apparatus for bundling a pile of letters, newspapers, documents and such like, and for tying up one or more articles.

An apparatus of this kind, as disclosed by the Dutch Patent specification 44,712 is provided with a gripper, by means of which binding means, such as a string, twine, cord or wire are looped round said pile or said article or articles, after which the contiguous branches of said binding means are fastened together by means of a clamp.

It was found, however, that it is undesirable to wind the binding means immediately around the pile or bundle, as this can cause a grazing or scouring action apt to damage the objects constituting said pile or bundle.

It is the object of the invention to improve such an apparatus so as to free it from this disadvantage.

According to the invention the apparatus of the aforementioned kind is provided with a gripper, constituted by clamp means, to hold the binding means, drag means such as a chain, to move said gripper along a path encompassing said pile, drawing at the same time a loop of binding means over retractable members, such as pegs, means to retract said members so as to let said loop of binding means fall over said pile, and stretch means to pull said loop tight around said pile.

The specific nature of the invention as well as other objects and advantages thereof will clearly appear from a description of an embodiment as shown in the accompanying drawing in which:

Figure 2 shows in diagram the preferred sequence and relative duration of various operations carried out by the apparatus.

Figure 16 shows partly in side view, partly in section the means to press the bundle, as well as the retractable pegs in operative position.

Figure 17 shows the same pegs retracted,

Figure 18 is a front elevation of the press,

Figures 19–20 show schematically said press in two different stages of operation, Figure 22 shows said rolling means in operation.

Figure 1:
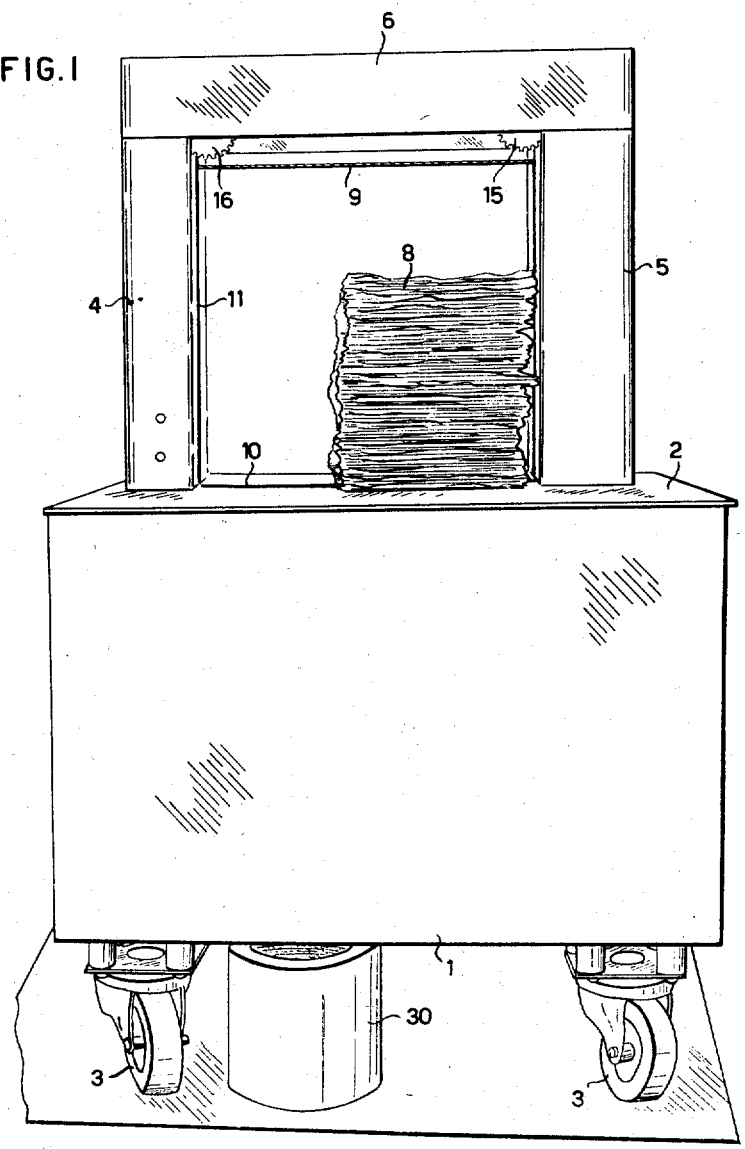
Figure 1 is a perspective view of the bundling apparatus.

The bundling apparatus comprises a casing 1 wherein is located the driving mechanism.

A bundling table 2 provided with a slot 10 constitutes the top of said casing. At the lower side of a casing are provided castors 3 so as to allow movement of the apparatus in any direction.

On table 2 are located two vertical columns 4, 5 provided with slots 11 and 12 respectively and connected with each other by means of a cross-piece 6. Parts 4, 5 and 6 define a rectangular space 7 in which space are positioned the articles 8 to be bundled, such as a pile of newspapers or letters. A string 9 which is used in this embodiment to bind the articles in question is drawn around said space beforehand so as to form a loop. This loop is located in the same plane as slots 10, 11 and 12. The operation of the apparatus is illustrated by Figures 2 to 13 inclusive.

Figure 3:
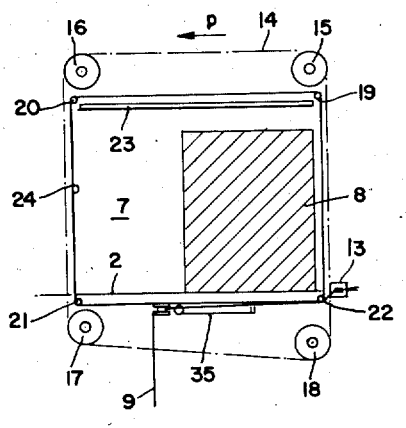

Figure 3 shows the initial position of the apparatus. This is a position wherein the articles 8 to be bundled are placed on table 2 and the apparatus is not yet brought into action. The free end of string 9 is held by gripper 13. This gripper is fastened to a double endless chain 14 which is guided through casing 1, columns 4 and 5 and cross piece 6 by sprocket wheels 15, 16, 17 and 18.

The loop of string 9 is formed by drawing the string over retractable pegs 19, 20, 21 and 22. This is carried out by moving gripper 13 around in the direction shown by the arrow p.

A press or platen 23 is positioned above the articles to be bundled and serves to compress said articles in order to achieve a tight packaging.

Figure 3 corresponds with position I shown in Figure 2. When the apparatus is brought into action the operations are carried out as shown in Figure 2 from the left to the right.

Figure 4:
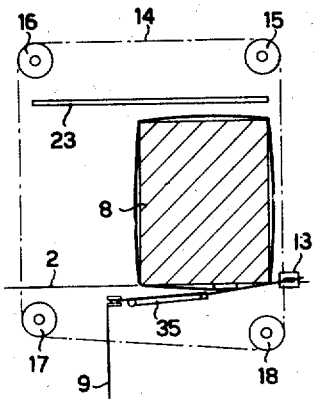
Figures 3–13 show schematically the various stages of operation of the apparatus.
Figure 5:
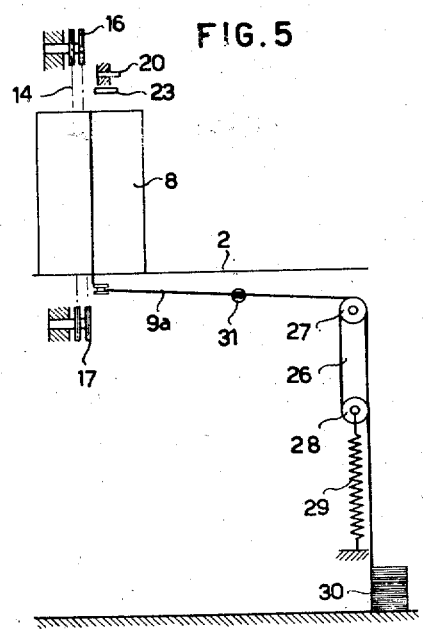

Figures 4 and 5 corresponding with positions II and III of Figure 2, show that when the press or platen 23 is moved in downward direction, pegs 19, 20, 21 and 22 are retracted, allowing thereby the loop of string 9 to fall loosely over pile 8.

The excess length of string, as loop 24 which was prepared in advance has a longer circumference than pile 8, is hauled in by means of a pulley arrangement 26. This pulley arrangement 26 comprises four sheaves 27 having a fixed position and three sheaves 28 which are movable and connected by means of a spring 29 with the frame of the apparatus. This arrangement provides a pretensioning for the part of the string 9a.

String 9 is provided by a store container 30. Spring 29 is adjusted so as to allow string 9 to fall loosely over pile 8.

Figure 6:
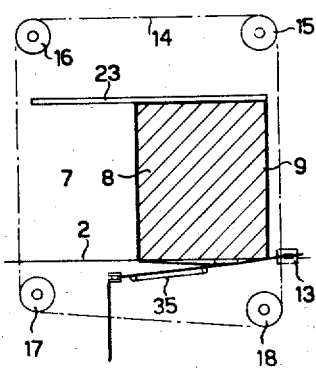
Figure 7:
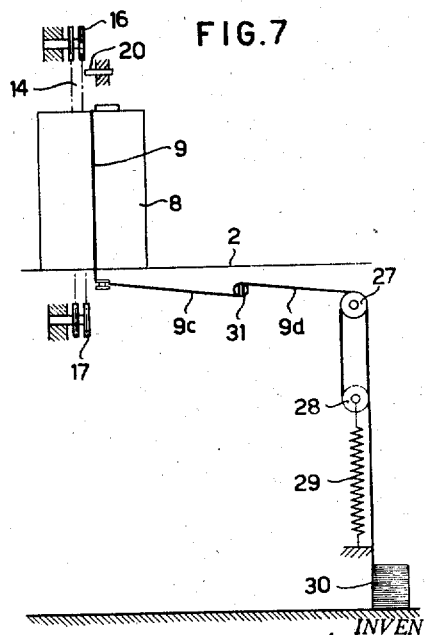

Figures 6 and 7 show the way in which string 9 is pulled tight around pile 8 (see position IV in Figure 2). Therefore part 9a of the string passes through appropriate tightening means. Said means comprise mainly a shaft 31 provided with a slot 32 (Figures 14, 15) in which slot string 9 can move freely.

After an appropriate length is cut off a reel of band iron and rolled and compressed around the contiguous parts of the string (see Figures 21 and 22), string 9 is cut off by a knife 34 near the string catcher 35.

Figure 8:
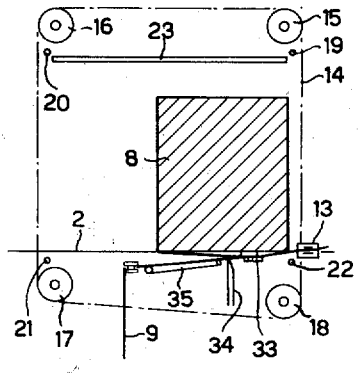
Figure 9:
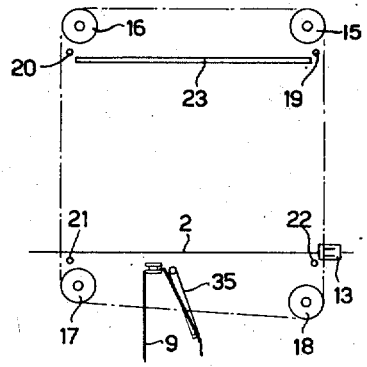
Figure 10:
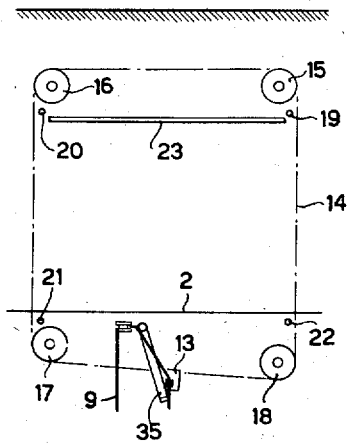
Figure 11:
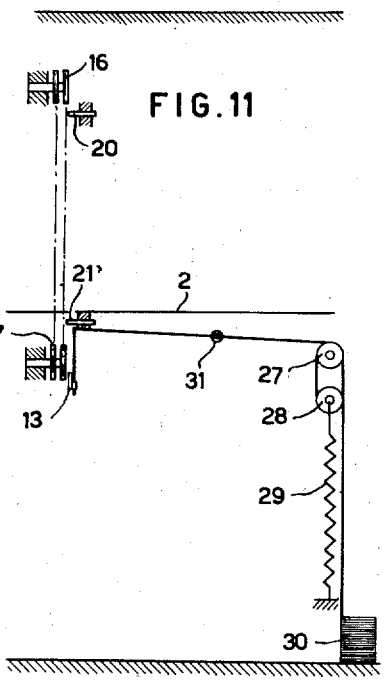
Figure 12:
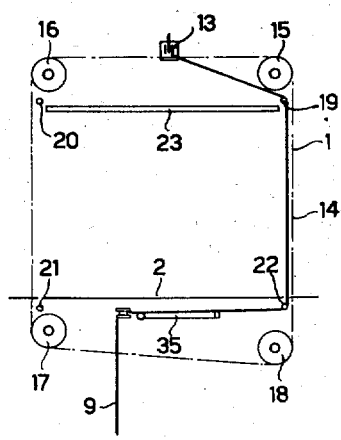

This situation is shown in Figure 8 and position V in Figure 2.

Pile 8 is now bundled and can be removed. In the meantime string catcher 35 with the free end of string 9 therein, is pivoted in a downward direction and places the string in the open gripper 13 which is closed thereupon (see Figure 9 and position IV as well as Figure 10 and position VII).

Figure 13:
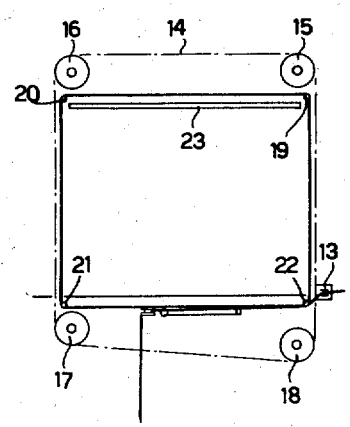

As gripper 13 passes along it takes over string 9 from string catcher 35 (Figures 10 and 11 and position VII of Figure 2), gripper 13 continues its movement (Figure 12 and position VIII) pulling thereby string 9 around pegs 19, 20, 21 and 22 (Figure 13). During the travel of the gripper the string catcher 35 is returned to its horizontal position.

Hereby the cycle is completed and a new pile of articles can be bundled.

Figure 14:
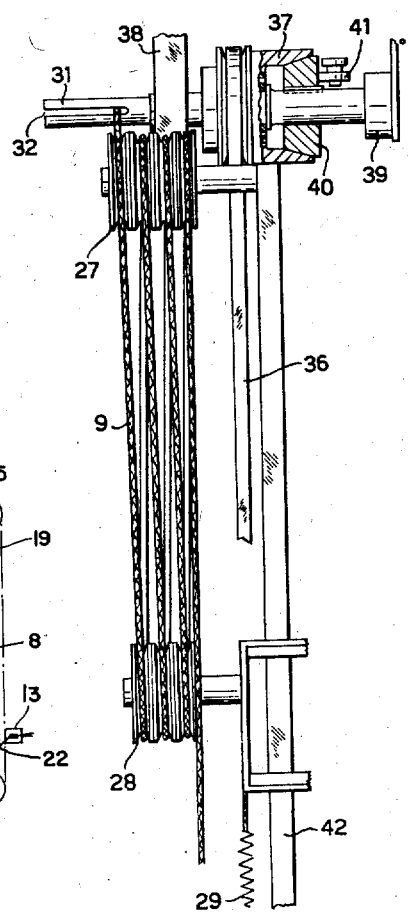
Figure 14 shows in elevation an embodiment of the means to tighten the loop around the bundle.
Figure 15:
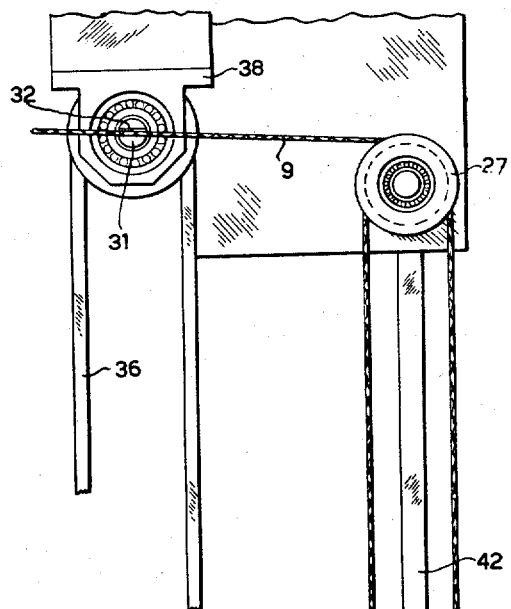
Figure 15 is a side view of the same means.

Figures 14 and 15 show an embodiment of the tightening means which shall now be described more in detail.

A V-belt 36 drives continuously a conical sheave 37 which can revolve loosely on a shaft 31 supported in bearings 38, 39.

A conical disc 40 is slidably mounted on shaft 31 and brought at the desired moment into contact with sheave 37 by means of a push-roller 41. Sheave 37 and disc 40 form together a frictional clutch which entrains the shaft 31 so that the string part 9a passing through slot 32 thereof is wound around shaft 31.

Figure 15A:
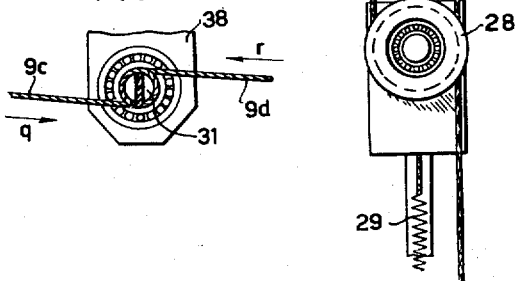
Figure 15a shows said means in operation.

Due to this the part 9c of the string, shown in Figure 15a, is pulled in the direction of the arrow q, whereas the part 9d of the string is pulled in the direction of the arrow r.

When the force with which part 9c of the string is pulled becomes high enough, clutch 37, 40 begins to slip.

This force can be adjusted by applying push-roller 41 with more or less pressure against disc 40.

The lower sheaves 28 of the pulley arrangement 26 are movable along guiding means 42 under the action of string 9 and the counteracting action of spring 29, allowing thereby to control the feed of string 9.

Figures 16, 17 and 18 illustrate a possible press arrangement.

A conical gear 43, driven by a shaft (not shown) meshes with conical gears 44, 45, loosely mounted on a shaft 49 and connectable therewith through clutches 46 and 47 respectively. When a clutch is thrown into engagement shaft 49 will rotate in a direction dependent on the clutch engaged. The ends of shaft 49 carry conical gears 50 and 51 respectively which mesh with gears 52 and 53 respectively provided with an internal screw thread. Screw spindles 54 and 55 cooperate with the internal screw thread of gears 52 and 53 so that said spindles will be moved up or down if a clutch is thrown into engagement.

At their free ends 56, 57 said spindles 54, 55 are linked to levers 58 and 59 respectively.

Ties 60 and 61 are connected at one of their ends by means of gudgeons 62, 63 with levers 58, 59 and at their other ends by means of gudgeons 64, 65 with slidable parts 66, 67. These parts 66, 67, which are movable along guides 68, 69 are firmly connected with a cross part 70 carrying a platen 23.

Push rollers 71 are provided at both sides of crosspiece 70. The pegs 19, 20, 21 and 22 are commanded by two two-armed levers 72 and 73 which are connected with each other by means of a tie 74.

When platen 23 is moved downwards by screw spindles 54, 55, roller 71 will contact plane 75 of tie 74 making thereby said tie to move in downward direction which in its turn will cause the levers to pivot around 76 and 77. Pegs 19, 20, 21 and 22 are hereby retracted allowing the loop of string 9 to fall over pile 8 (see Figure 17). In order to arrest the movement of platen 23, when a sufficient compression of pile 8 is achieved, an automatic stopping and reversal mechanism is brought into action. To this end lever 59 is pivotably connected by means of a pin 78 with an arm 79. A shaft 80 extends transversely through one end of the arm 79. The other end thereof is provided with a screw spindle 82 which is movable by means of a handwheel 81 up and down with respect to said arm in a bore provided with a screw thread cooperating with the thread of said spindle. Said spindle compresses a spring 83 whose lower end has a fixed position.

Figure 19:
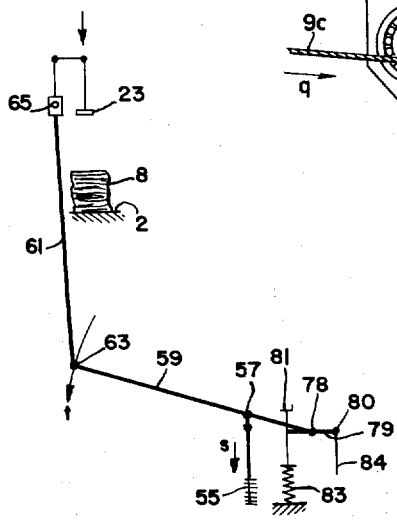

Figures 19 and 20 illustrate schematically the action of the stopping mechanism.

Spindle 55 commanding the platen is moved in a downward direction as explained above when the press is brought into action. Lever 59 pivots around point 78 in the direction shown by the arrow t, causing the press to be pulled downwards by tie 61 until it compresses pile 8 (see Figure 20).

Due to the compression of pile 8 a reactive force will act upon the platen 23, as shown by arrow u.

Pivot 63 of lever 59 can now be considered as being stationary.

Spindle 55, however, continues its downward movement causing thereby lever 59 to pivot around point 63 as shown by the arrow v.

In consequence a force Z will occur in point 78 causing thereby arm 79 to pivot together with shaft 80 around the axis of said shaft as shown by arrow w, compressing in doing so spring 83. A tie rod 84 which is fastened to shaft 80 will be moved by said shaft and bring into action an appropriate control mechanism to stop the driving shaft 49.

At a later period, corresponding to the position V of Figure 2, an appropriate reversal mechanism is put into action to cause the gears 50 and 51 to revolve in a contrary direction moving spindles 54, 55 in upward direction. It is obvious that by giving spring 83 a higher or lower precompression by means of handwheel 81 a higher or a lower reactive force will be achieved which in its turn will determine the compressive force exerted by the platen upon the pile.

Figure 21:
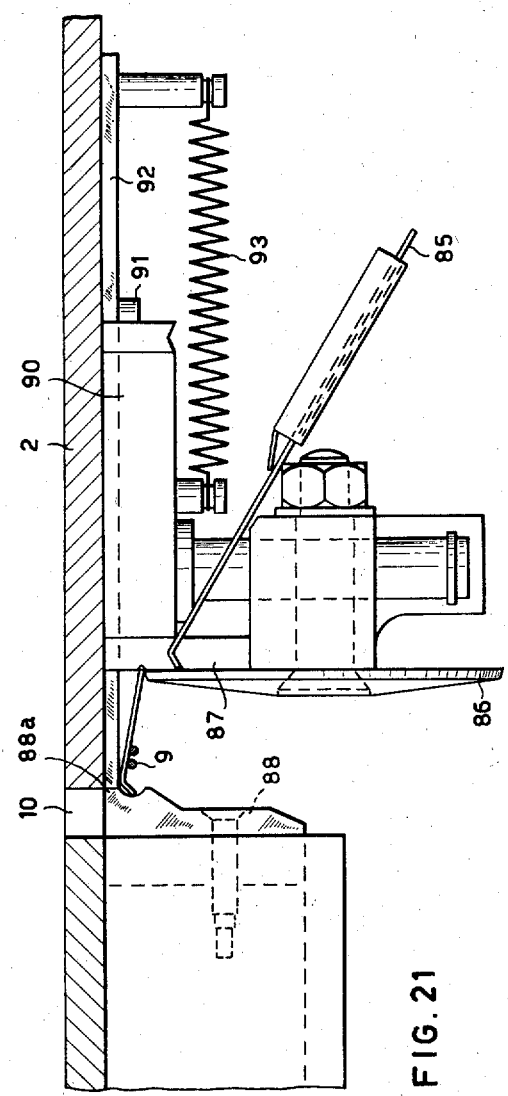
Figure 21 is a section through the bundling table to show in view the means to cut a length of sealing band off a reel and to roll said length tightly around two contiguous branches of the binding means so as to clamp them together.

The cutting of an appropriate length from the band metal and the rolling thereof into a tubular clamp is shown in Figures 21 and 22.

The band 85 is fed in forward direction and an appropriate length is cut off by means of a knife 86 while a die 87 simultaneously preforms the next part of metal band.

A second die 88 rolls subsequently the cut off piece into a tube 33 to press and lock together the contiguous branches of string 9.

During the rolling process the band is supported in a groove 94 provided to this end in the counter die cooperating with the die 87.

Die 88 cooperates with a slidable part 92 which is guided in a casing 90 and is provided with a stop 91. A spring 93 having its one end fastened to said casing and its other one to slidable part 92 acts on said slidable part urging it from right to left. Movement of part 92 is arrested when a stop 91 provided to this end on said slidable part 92 comes in contact with the righthand face of casing 90.

The rolling of the tubular clamp is preferably carried out between the upper part of die 88 and the lower place of slidable part 92. The advantage of said slidable part is that it makes it possible to provide a strong design for part 88a of die 88.

What is claimed is:

1. In a string bundling machine, a table upon which items to be bundled are stacked, a framework supported on said table defining with the table an area available for the stacking of items, a series of spaced pegs each of which is located at a corner of said framework, a source of string supply, a gripper for the end of said string, cyclic means traversing said gripper outwardly around said pegs and completely around said stack, thereby overlapping said string upon itself, said gripper then remaining stationary, means withdrawing all of said pegs from the path of said string whereby it falls onto said stack, spring pressed means tightening said string by withdrawing the same toward its direction of original feeding as it loses contact with said pegs, tension means gripping and tensioning said string located between said spring pressed means and said gripper exerting tension from the direction of original feeding of the string, clamp means firmly clamping said string at a point near said gripper and means cutting said string adjacent said clamp.

2. The combination as set forth in claim 1 together with string catching means in position to grasp the end of said string immediately after the same has been cut, said string catching means maintaining its grip on the end of said string while said gripper means continues its movement, said gripper means gripping said string thereby removing it from said string catching means on making its next cyclic pass past said spring catching means.

3. In a bundling machine, a table upon which items to be bundled are stacked, an endless chain, a framework arising from said table housing said chain, a string gripper mounted on said chain, four pegs mounted at the several corners of the opening defined by said frame and said table, a source of string supply, said gripper in a cyclic operation laying a strand of string onto said pegs in envelopment of said stack and coming to rest adjacent a lower corner of said stack, means withdrawing said pegs whereby said string falls onto said stack, spring pressed means exerting a pull on said string from the direction of supply drawing said string firmly about said pack, tension means gripping said string between said source of supply and said gripper applying tension thereon, and means clamping said string upon itself while said tension means maintains its tension.

4. In a bundling machine, a table upon which items to be bundled are stacked, an endless chain, a framework arising from said table defining with the table a space available for said stack and housing said chain, a string gripper mounted on said chain, a peg mounted near each corner of the defined space, a source of string supply below said table, said gripper traversing a cyclic path defined by said chain to lay said string onto said pegs, said string upon leaving its source of supply overlying pulleys maintained in spaced relation by a spring means, means withdrawing said pegs from the path of said string whereby said spring means tightens said string about said stack, tension means located between said pulleys and said gripper operative subsequent to tightening of said string to exert tension thereon, means located adjacent said gripper clamping said string upon itself and means severing said string adjacent the clamping means.

5. In a string bundling machine, a table upon which items to be bundled are stacked, a framework supported on said table defining with the table an area available for the stacking of items, a series of spaced pegs each of which is located at a corner of said framework, a source of string supply, a gripper for the end of said string, cyclic means traversing said gripper outwardly around said pegs and completely around said stack, thereby overlapping said string upon itself, said gripper then remaining stationary, means for withdrawing all of said pegs from the path of said string whereby it falls onto said stack, spring pressed means for tightening said string by withdrawing the same toward its direction of original feeding as it loses contact with said pegs, tension means for gripping and tensioning said string located between said spring pressed means and said gripper exerting tension from the direction of original feeding of the string, said tensioning means comprising a shaft having a slot in the exposed end thereof, the string easily passing through said slot when said shaft is stationary and means for rotating said shaft when tension is to be applied on the string enveloping said shaft, said shaft upon rotation winding the string upon itself thus exerting the tension, means for clamping said string upon itself while said shaft maintains the tension, and means for cutting said string between said shaft and the clamping means.

6. In a string bundling machine, a table upon which items to be bundled are stacked, a framework supported on said table defining with the table an area available for the stacking of items, a series of spaced pegs each of which is located at a corner of said framework, a source of string supply, a gripper for the end of said string, cyclic means traversing said gripper outwardly around said pegs and completely around said stack thereby overlapping said string upon itself, said gripper then remaining stationary, means withdrawing all of said pegs from the path of said string whereby it falls onto said stack, spring pressed means tightening said string by withdrawing it toward its direction of original feeding as it loses contact with said pags, tension means gripping and tensioning said string located beneath said spring pressed means and said gripper exerting tension from the direction of original feeding of the string, said tensioning means comprising a shaft having a slot in the exposed end thereof, the string passing easily through said slot when said shaft is stationary, driving means for said shaft active through a clutch, said shaft upon rotation winding said string therearound to exert tension on the string enveloping the stack, said clutch being adapted to slip when said string attains a predetermined tension, means clamping said string upon itself while said shaft maintains the desired tension, means severing said string adjacent the clamping means, means releasing said clutch from engagement with said shaft whereby it becomes freely rotatable to release said string, and a string catcher grasping and holding the severed end of said string pending the next cyclic pass of said gripper.

7. In a bundling machine, a table having a stack of items thereon to be bundled, a framework arising from said table defining with the table a space available for the stack, a press platen supported by said frame, means depressing said platen onto the stack to compress same, automatic means regulating the amount of pressure exerted on said stack, a series of pegs one of which is located at each corner of the area available for said stack and said platen, a source of string supply, gripper means positioning said string on said pegs, means responsive to the movement of said platen withdrawing said pegs from the path of said string as pressure is imposed on said stack by said platen, spring pressed means active in the direction of the string supply tightening said string about said stack, tensioning means located between said spring pressed means and said gripper imposing tension on said string subsequent to tightening thereof, automatic means regulating the tension imposed on said string, means clamping said string upon itself between said tensioning means and said gripper, and means located near said tensioning means severing said string after the clamping thereof.

8. In a bundling machine, a table having a stack of items thereon to be bundled, means applying a string around said stack, a press platen supported from said table above said stack, means drawing said platen down onto said stack comprising a power driven shaft, an arm movable by said shaft, a beam mounted on a pivot at one end and pivotally connected through a linkage to said platen at its other end, said arm upon movement by said shaft depressing one end of said beam thereby depressing said platen against said stack, the pivot at the other end of said beam being spring supported, said arm upon exerting further force against said beam causing said pivot to move while compressing said spring, means responsive to the movement of said pivot for cutting off the power supplied to said shaft, and means clamping said string about said stack when the pressure thereon by said platen is at maximum value.

9. In a bundling machine, a table adapted to receive a stack of items to be bundled, an open framework supported by said table defining an opening available for the stack, a peg near each corner of said opening, means applying a string around the series of pegs, a pressure platen supported by said framework, means forcing said platen down onto said stock comprising a power driven shaft, an arm movable by rotation of said shaft, a beam to which said arm is pivotally connected at a point between its ends, one end of said beam being supported by a spring, manual means for adjusting the initial compression on said spring, the other end of said beam being pivotally connected through a linkage to said platen, said arm upon actuation by said shaft depressing the end of said beam connected to platen, said arm upon continued movement imposing the maximum predetermined pressure on said stack by said platen and thereafter causing the other end of said beam to depress its supporting spring, means responsive to the depression of the spring supported end of said beam cutting the power from said shaft, means responsive to the movement of said platen toward said stack withdrawing said pegs from the path of said string, means tensioning said string about said stack, means clamping said string upon itself while said stack is under maximum compression by said plate, and means cutting said string immediately after the clamping is completed.

References Cited in the file of this patent

UNITED STATES PATENTS

| | | |
|---|---|---|
| 1,273,115 | Brooks | July 16, 1918 |
| 2,262,232 | Harvey | Nov. 11, 1941 |
| 2,608,150 | Cranston | Aug. 26, 1952 |

FOREIGN PATENTS

| | | |
|---|---|---|
| 87,442 | Norway | May 14, 1956 |